UNITED STATES PATENT OFFICE.

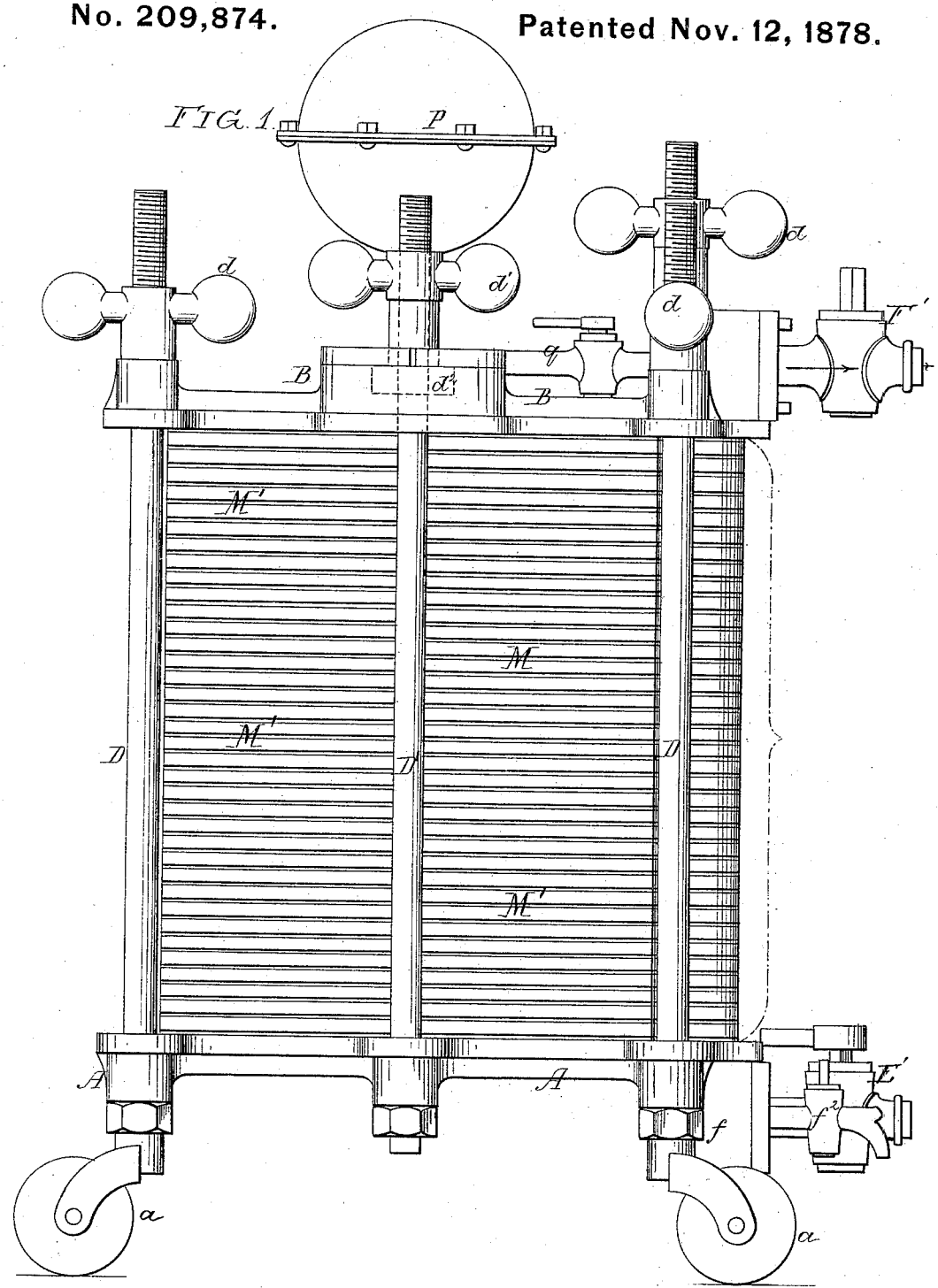

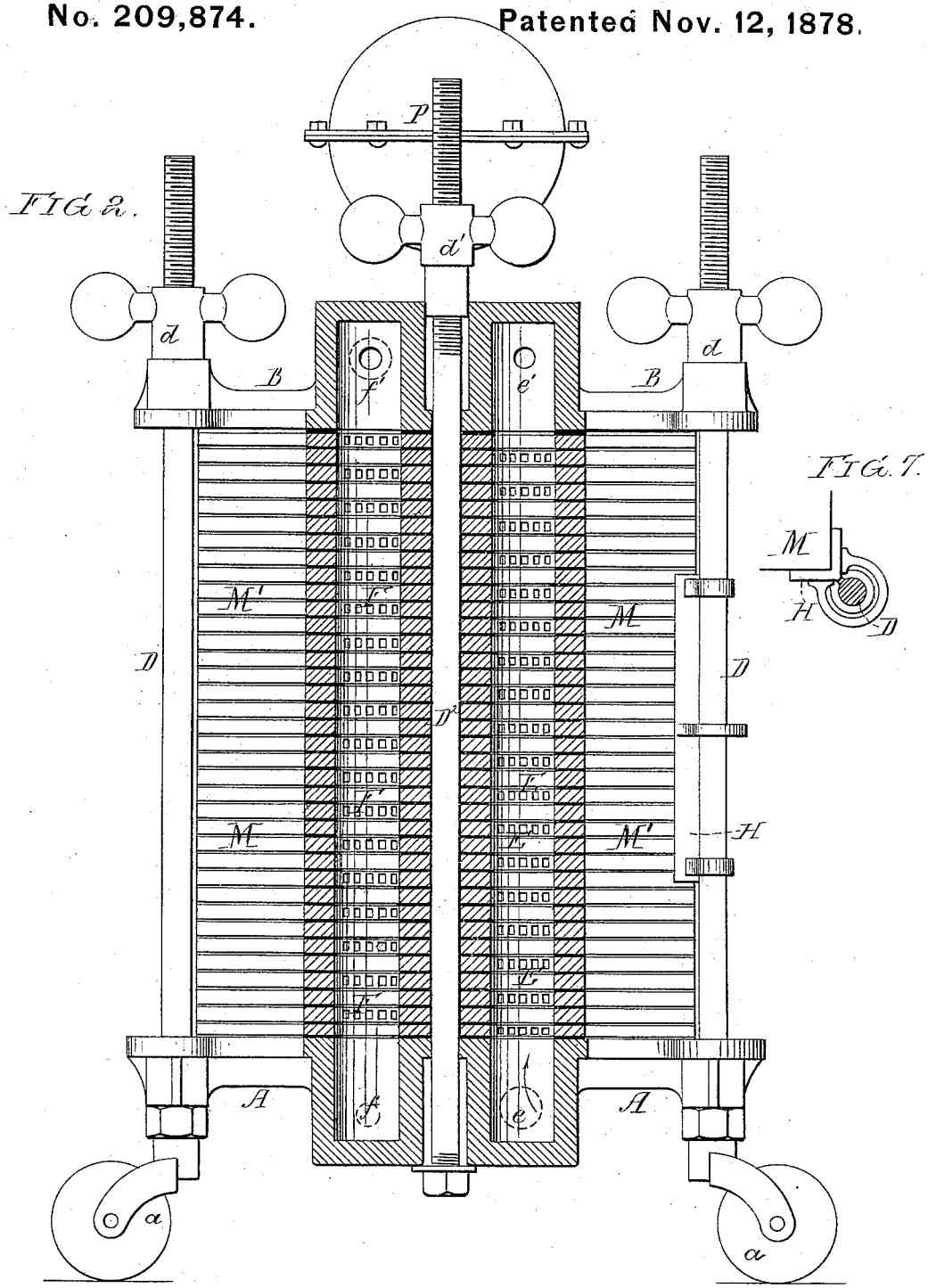

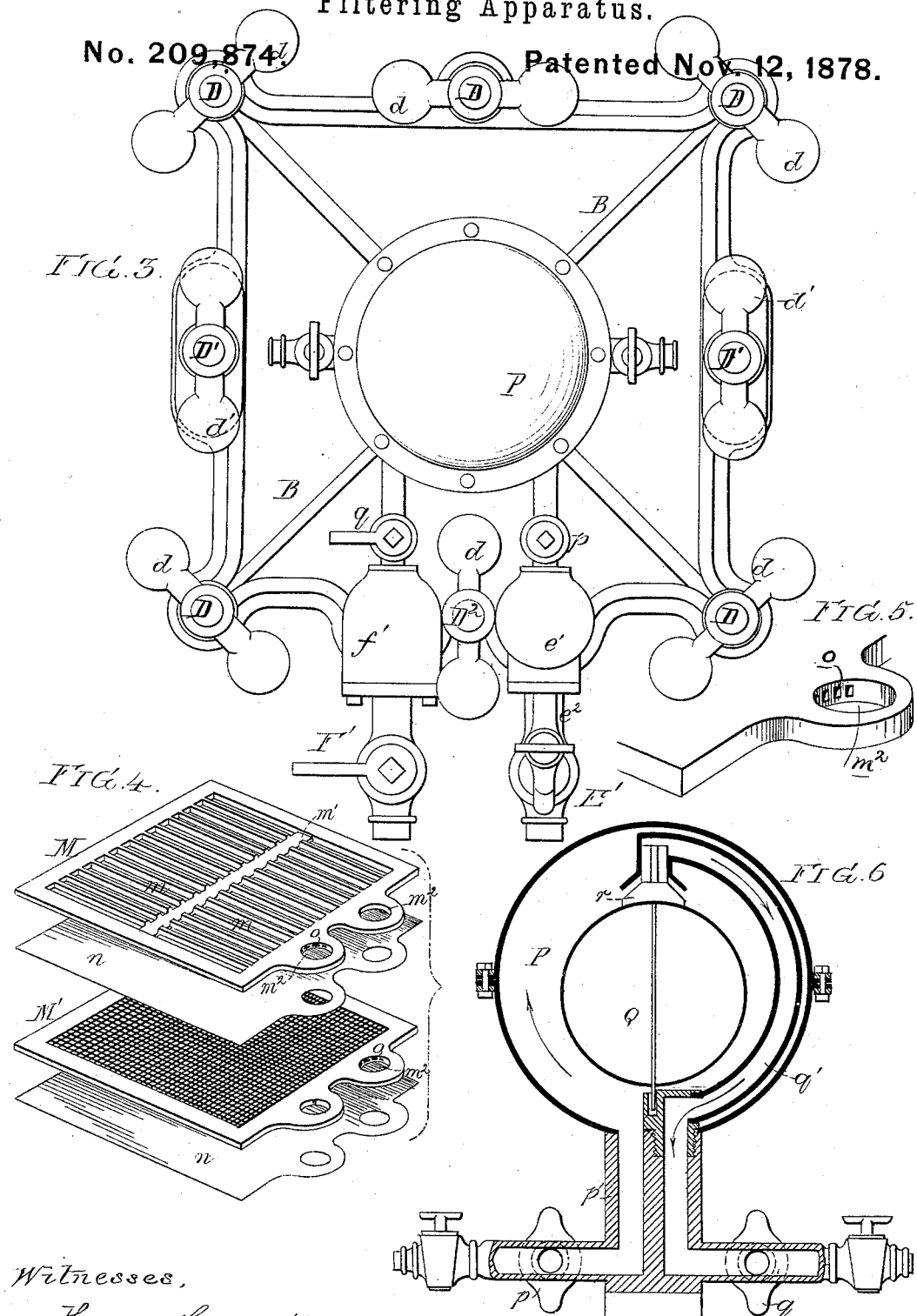

LORENZ A. ENZINGER, OF WORMS, GERMANY.

IMPROVEMENT IN FILTERING APPARATUS.

Specification forming part of Letters Patent No. 209,874, dated November 12, 1878; application filed September 30, 1878.

*To all whom it may concern:*

Be it known that I, LORENZ ADALBERT ENZINGER, of Worms, Germany, have invented an Improved Filtering Apparatus, of which the following is a specification:

The main object of my invention is to so construct a filtering apparatus of larger capacity that it will occupy but little space, and so that the parts can be easily removed for cleansing purposes and repairing, the apparatus being applicable to the filtration of aerated waters, as well as other liquids. This object I attain in the manner which I will now proceed to describe, reference being had to the accompanying drawings, in which—

Figure 1, Sheet 1, is a side view of my improved filtering apparatus; Fig. 2, Sheet 2, an end view, partly in section; Fig. 3, a plan view; Fig. 4, a perspective view of the filter-screens and filter-sheets; Fig. 5, an enlarged view of one of the screens shown in Fig. 4; Fig. 6, a sectional view of apparatus to be used in filtering aerated waters, and Fig. 7 a plan of part of Fig. 1.

The filter consists of the following main parts, viz., a bottom plate, A, preferably mounted on rollers $a$, corresponding top plate, B, and an intervening series of alternate filtering screens and sheets of filtering material, the whole being firmly secured together by substantial vertical bolts D D and $D^1$ and $D^2$, provided at the top with suitable nuts $d\ d'$.

On one side of the plate A are two adjoining pockets, $e$ and $f$, and on the top plate, B, are formed two similar pockets, $e^1$ and $f^1$, Fig. 2, and in each of the filtering-screens and filtering-sheets are two openings corresponding with the pockets, Fig. 4, and so arranged that when all the parts are in position these openings will form, with the pockets, two vertical chambers, E and F, Fig. 2, liquid being introduced into the former chamber and discharged into the chamber F from the interior of the filtering-screens. The liquid is admitted under pressure to the pocket $e$ through a suitable cock, E', and discharged from the pocket $f^1$ through a cock, F', and the pockets $e^1$ and $f$ are provided with small try-cocks, $e^2$ and $f^2$, respectively, the former for the unfiltered liquid and the latter for the filtered liquid, Figs. 1 and 3.

The filtering-screens are constructed as shown in the perspective views, Figs. 4 and 5, in which M represents one form of screen, and M' a modification of the same, while $n\ n$ represent the sheets, made of filtering-paper, felt, or other equivalent material. The filtering-screen M consists of a rectangular frame, having at one edge the openings $m^2\ m^2$, which assist in forming the aforesaid vertical chambers E F when the several parts of the filter are put together.

The frame has a series of bars, $m\ m$, connected near the middle by a thin transverse bar, $m^1$, so constructed as to leave a space or channel between the top of this bar and the adjacent filtering-sheet. One of the openings, $m^2$, communicates with the space between the bars through openings $o$ in the frame. Consequently this space has a free communication with the vertical chamber F.

The screens M' are similar to the screens M, except that two sheets of wire-gauze secured to the frame are substituted for the bars $m\ m^1$, suitable rods being placed between the two sheets of wire-gauze to keep them apart. In placing these screens in the filter with the filtering-sheets they should be so alternated that, while the openings $o$ of one screen communicate, say, with the chamber E, the openings $o$ of the next screen will communicate with the chamber F, Fig. 4.

The nuts $d^1$ of the bolts $D^1$ have collars $d^2$, adapted to recesses in the top plate, Fig. 1, so that when the several nuts are unscrewed the top plate will be raised and release the filtering sheets and screens, any of which can then be withdrawn, or additional screens or sheets inserted after removing the rod $D^2$, Fig. 2.

An angular adjustable slide, H, (shown in Fig. 2, and in the detached view, Fig. 7,) is adapted to one of the corner-rods as a guide for the proper adjustment of the screens.

When the top plate is screwed down, the sheets of filtering material make a tight joint between the frames of the several filtering-screens, so that the liquid which flows in through the cock E' fills the chamber E, and, passing through the openings $o$ in the alternate filtering-screens, Fig. 2, has to pass through one or more of the adjacent filtering sheets and screens before it can pass into the outlet-chamber F and out through the cock F'.

When it is desired to employ the above-described filter for aerated waters, I make use of the device illustrated in Fig. 6, to allow the gas to escape from the chamber E into the outlet-chamber F, while the liquid is compelled to pass through the filter.

The top of the chamber E communicates through a pipe, $p$, and passage $p'$, with the chamber P, in which is arranged a float, Q, having a valve, $r$, adapted to a seat in the bent pipe $q'$, this latter pipe being in communication, through a branch pipe, $q$, Figs. 1 and 3, with the upper part of the chamber F.

The valves in the pipes $p$ and $q$ being open, the gas from the aerated water will escape through the pipe $p$ and passage $p'$ into the chamber P, whence it will pass through the pipes $q'$ $q$ into the outlet-chamber F. The water will also pass through the same pipes $p$ $p'$ until it reaches such a height in the chamber P as to raise the float Q and close the valve $r$.

As the gas accumulates in the chamber P, however, it will force back the water therein, and the float R will fall, so as to allow the gas to escape through the passages $q'$ $q$ to the chamber F. By this means, while the gas can escape from one chamber to the other, the water must pass through the filtering plates and sheets.

I claim as my invention—

1. The combination of the top and bottom plates, with their pockets, with screens and filtering-plates, having openings corresponding with the said pockets, and forming therewith chambers E and F, which communicate through openings $o$ and through the screens with filtering-sheets confined between the screens, all substantially as specified.

2. In a filter, the series of screens and intermediate filtering-sheets, having openings which assist in forming chambers E F, and passages so arranged that the liquid cannot pass from one chamber to the other excepting through the filtering-sheets, as specified.

3. A filter-screen consisting of a frame having two sheets of wire-gauze and openings, $m^2$, one of which communicates through openings in the frame with the space between the screens, as set forth.

4. The combination of the series of removable filter-screens with a guide-plate, H.

5. The combination of a filtering apparatus having inlet and outlet chambers E F with devices, substantially as described, whereby the gas from aerated waters under filtration may pass from one chamber to the other, while the water is compelled to pass through the filtering material.

6. The combination of the filter-chambers with chamber P, float Q, carrying a valve, $r$, and the pipe $q'$, all substantially as specified.

In testimony that I claim the foregoing I have hereunto set my hand this 21st day of May, 1878.

L. A. ENZINGER.

Witnesses:
FRANZ WIRTH,
FRANZ HASSLACHER.